United States Patent
Eide

(10) Patent No.: US 8,805,192 B2
(45) Date of Patent: Aug. 12, 2014

(54) METHOD OF DIRECTING AN OPTICAL RECEIVER TOWARD A LIGHT SOURCE AND AN APPARATUS OF PRACTICING THE METHOD

(75) Inventor: Jan Eide, Kristiansand (NO)

(73) Assignee: Polewall AS, Kristiansand (NO)

( * ) Notice: Subject to any disclaimer, the term of this patent is extended or adjusted under 35 U.S.C. 154(b) by 0 days.

(21) Appl. No.: 13/583,592

(22) PCT Filed: Mar. 14, 2011

(86) PCT No.: PCT/NO2011/000082
§ 371 (c)(1),
(2), (4) Date: Oct. 5, 2012

(87) PCT Pub. No.: WO2011/115499
PCT Pub. Date: Sep. 22, 2011

(65) Prior Publication Data
US 2013/0082162 A1    Apr. 4, 2013

(30) Foreign Application Priority Data
Mar. 16, 2010 (NO) .................. 20100377

(51) Int. Cl.
*H04B 10/02* (2006.01)
*G01J 1/04* (2006.01)
*H04B 10/112* (2013.01)
*H04B 10/114* (2013.01)

(52) U.S. Cl.
CPC ......... *G01J 1/0403* (2013.01); *G01J 1/0407* (2013.01); *H04B 10/1123* (2013.01); *H04B 10/1143* (2013.01)
USPC ............................................ 398/129

(58) Field of Classification Search
CPC ........................................ H04B 10/40
USPC ........................................ 398/129
See application file for complete search history.

(56) References Cited

U.S. PATENT DOCUMENTS 4,713,533 A    12/1987  Bremer et al.
5,347,387 A *  9/1994  Rice .................. 398/129
(Continued)

FOREIGN PATENT DOCUMENTS

EP    0 911 995 A2    4/1999
JP    S60-16038 A     1/1985
(Continued)

OTHER PUBLICATIONS

International Search Report for parent application PCT/NO2011/000082, having a mailing date of Jun. 14, 2011.

(Continued)

*Primary Examiner* — Ken Vanderpuye
*Assistant Examiner* — Amritbir Sandhu
(74) *Attorney, Agent, or Firm* — Andrus Intellectual Property Law, LLP

(57) ABSTRACT

A method and an apparatus are for directing an optical receiver toward a light source, using a plurality of light detectors arranged around the receiver's optical axis to check where light (L) hits the light detectors relative to the optical axis. The method includes the steps of: A) arranging the receiver defocused to embrace a largest possible field of view of the area wherein the light source may be located, and refracting the light with largest possible spread angle; B) letting the receiver search for the light source until the light (L) hits at least one of the light detectors; C) calculating where the light hits relative to the optical axis, and adjusting the receiver, directing the light toward the optical axis; D) reducing the field of view embraced by the receiver; and E) repeating the steps C and D until the light is concentrated in a smallest possible area.

6 Claims, 8 Drawing Sheets

(56) References Cited

U.S. PATENT DOCUMENTS

| | | | |
|---|---|---|---|
| 5,770,850 A * | 6/1998 | Bowen et al. | 250/203.1 |
| 6,335,811 B1 * | 1/2002 | Sakanaka | 398/129 |
| 6,353,491 B1 * | 3/2002 | Tanaka et al. | 398/139 |
| 7,079,774 B2 * | 7/2006 | Sidorovich et al. | 398/129 |
| 7,646,986 B2 * | 1/2010 | Yasumoto et al. | 398/156 |
| 8,200,094 B1 * | 6/2012 | Zhovnirovsky et al. | 398/129 |
| 2002/0173937 A1 | 11/2002 | Martin et al. | |
| 2002/0196506 A1 | 12/2002 | Graves et al. | |
| 2003/0016420 A1 * | 1/2003 | Holmstrom et al. | 359/159 |
| 2004/0042798 A1 * | 3/2004 | Kehr et al. | 398/135 |
| 2004/0141753 A1 | 7/2004 | Andreu-von Euw et al. | |
| 2004/0240798 A1 * | 12/2004 | Baur | 385/88 |
| 2004/0258415 A1 | 12/2004 | Boone et al. | |
| 2005/0175298 A1 * | 8/2005 | Matta et al. | 385/93 |
| 2005/0265724 A1 * | 12/2005 | Sakanaka et al. | 398/140 |
| 2007/0110442 A1 * | 5/2007 | Peer | 398/78 |
| 2008/0101796 A1 * | 5/2008 | Iida et al. | 398/41 |
| 2008/0152348 A1 * | 6/2008 | Chen | 398/130 |
| 2010/0086310 A1 * | 4/2010 | Lee et al. | 398/138 |
| 2011/0268453 A1 * | 11/2011 | Fest et al. | 398/129 |
| 2012/0148256 A1 * | 6/2012 | Hwang et al. | 398/136 |

FOREIGN PATENT DOCUMENTS

| | | |
|---|---|---|
| JP | 1-236834 A | 9/1989 |
| JP | 6-11559 A | 1/1994 |
| JP | 9-172391 A | 6/1997 |
| JP | 2002-352463 A | 12/2002 |
| JP | 2005-229359 A | 8/2005 |
| JP | 2008-131156 A | 6/2008 |

OTHER PUBLICATIONS

Written Opinion for parent application PCT/NO2011/000082, having a mailing date of Jun. 14, 2011.

Wong, K. K. et al, "Infrared Wireless Communication Using Spread Spectrum Techniques", IEE Proc.—Optoelectron., vol. 147, No. 4, Aug. 2000, pp. 308-314.

Rabadan, Jose A. et al, "Wireless Optical Spread Spectrum Communications. Data Security Improvement in Wireless Links", Security Technology 2005, CCST 2005, 39th Annual 2005 International Carnahan Conference, Oct. 11, 2005, pp. 168-170.

* cited by examiner

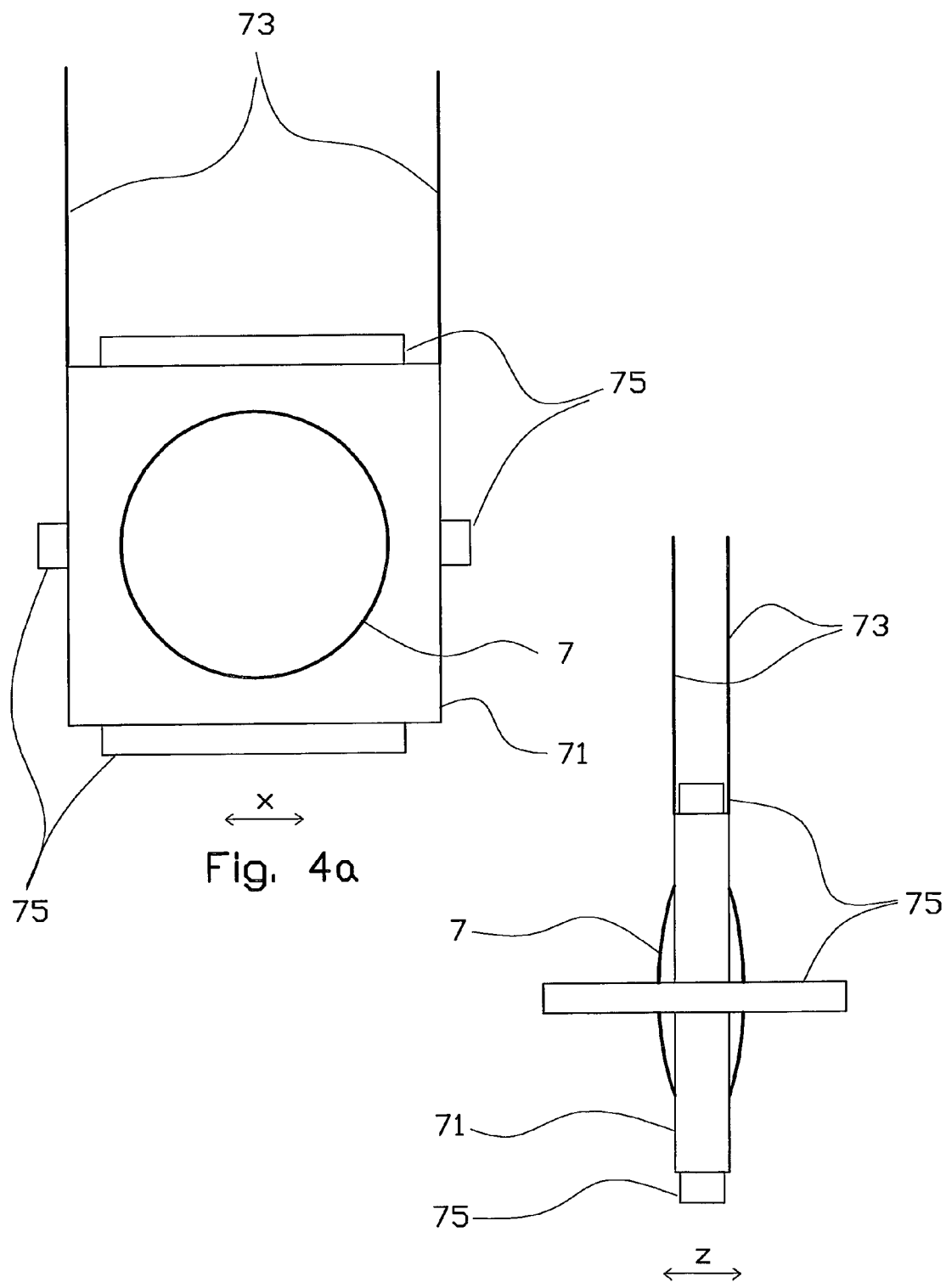

METHOD OF DIRECTING AN OPTICAL RECEIVER TOWARD A LIGHT SOURCE AND AN APPARATUS OF PRACTICING THE METHOD

CROSS-REFERENCE TO RELATED APPLICATIONS

This application is the U.S. national stage application of International Application No. PCT/NO2011/000082, filed Mar. 14, 2011, which International application was published on Sep. 22, 2011 as International Publication No. WO 2011/115499 A1 in the English language and which application is incorporated herein by reference. The International application claims priority of Norwegian Patent Application No. 20100377, filed Mar. 16, 2010, which application is incorporated herein by reference.

BACKGROUND

The present invention relates to a method of directing an optical receiver toward a light source and an apparatus for practicing the method. More particularly it concerns a method and an apparatus for directing an optical receiver toward a light source, where the method includes the use of a plurality of light detectors arranged around the receiver's optical axis to check how the light hits the light detectors relative to the optical axis. The light source may for example be an optical transmitter.

It is known to use an optical receiver in a communication system. For the receiver to be able to function as good as possible it is vital that the receiver is directed toward the light source. I.e. the receiver's optical axis is directed toward the light source. Such a directing, which in the specialist environment is also referred to as alignment, is according to prior art performed by the receiver being manually at least coarsely directed toward the light source. Coarse directing means a directing where the receiver is directed toward the light source with such accuracy that the light beam from the light source hits the receiver optics. Such coarse directing can be time consuming and costly and will have to be repeated if the receiver's pointing direction comes out of position relative to the light source.

Apparatuses that will be able to undertake a fine directing such that the receiver's optical axis is aligned with the light source's optical axis, as soon as the receiver is coarsely directed, are known. The apparatuses' fine directing may be based on measuring where the light hits relative to the receiver's optical axis.

Such an apparatus is known from the publication EP 0653 852 A1 describing an optical transceiver or transmitter-receiver wherein two opposing transceivers must be directed toward each other manually before a fine directing or aligning of the optical axes are undertaken automatically. The coarse directing is undertaken by means of a sighting device allocated to the transceiver.

Another such apparatus is known from the publication US 2002/0196506 A1 describing an apparatus for optical transmission of data between two opposing transceivers. The apparatus includes two telescopes directed toward each other and provided with inter alia deformable mirrors being able to compensate for varying atmospheric conditions such as fog and precipitation, and for aberration that might affect the light being sent between the transceivers. The transceivers according to US 2002/0196506 A1 must be manually directed toward each other.

A transceiver with an optical receiver with driving means for scanning, focusing means and an optical transmitter, connected to the receiver, is known from the publication EP 0911995 A2.

SUMMARY

The object of the invention is to remedy or reduce at least one of prior art's disadvantages, or at least to provide a useful alternative to prior art.

The object is achieved by the features disclosed in the below description and in the subsequent claims.

According to a first aspect of the present invention there is provided a method for directing an optical receiver with an allocated optical transmitter, toward a light source, where the method includes the use of a plurality of light detectors arranged around the receiver's optical axis to check where the light from the light source hits the light detectors relative to the optical axis, the method including the steps is of:

A) arranging the receiver defocused such that optics allocated in said receiver, is set to let the receiver embrace a largest possible field of view of the area wherein the light source may be located, and the light is refracted with the is largest possible spread angle toward the light detectors;

B) letting the receiver search for the light source by scanning the surroundings until the light from the light source hits at least one of the light detectors;

C) calculating where the light hits relative to the optical axis, and within the current field of view, adjusting the receiver such that the light from the light source is directed toward the optical axis;

D) reducing the field of view embraced by the receiver, by means of the receiver's optics; and E) repeating the steps C and D until the light is concentrated in a smallest possible area on the light detectors, where the optical axis and the spread angle of a light beam sent out from the transmitter, are dependent on the directing of the optical axis and the receiver's field of view.

It is thus provided a method for orienting a focusable light beam from a transmitter, where the direction and spread angle of the light beam is controlled by the receiver's direction and field of view, which are being directed toward the light source. This has the advantage that the transmitting direction and spread angle of the transmitter are exclusively controlled by an allocated receiver, and is thus independent of feedback from another receiver that the transmitter might be transmitting to.

The transmitter and receiver may be arranged as separate units, but it may be advantageous for practical reasons to arrange the transmitter and receiver as a transceiver.

In one embodiment the transceiver's optical system is arranged confocally. One of the advantages of this is that the orientation and spread angle of the light beam from the transmitter, being decided by the receiver's direction and field of view, are facilitated.

The receiver will in step B be able to detect more than one light source. To be able to direct the receiver toward a certain light source the receiver in an aspect of the invention is arranged with means to be able to recognize one light source among many. For this is used a key, transmitted from the light source, which modulates light with a spread spectrum. The use of a key being transmitted from the light source, which is modulated with a spread spectrum, may also have advantages regarding difficult atmospheric conditions that weaken the light. An example of a difficult atmospheric condition is fog.

The light may be a laser light, but is not limited to this.

Coding of spread spectrum is well known from radio technology, for example from the publication JP 9172391. In spread spectrum systems the bandwidth is exchanged for sensitivity. The energy per bit is the same, but since each bit is divided into several so-called "chips" the energy per chip is much less. On the other hand the occupied bandwidth increases, as many chips has to be transferred per bit. In radio technology this renders the possibility for camouflaging a signal as noise, as the energy per chip may be kept below the noise limit. By demodulating with the right key, the contribution from each single chip may be added up. After having added all the contributions, the net contribution equal to the energy in a bit, is found. If this is above the noise limit the signal may be detected. Receivers that do not know the key will not have the possibility to add the contributions correctly, and will not be able to separate the signal from the noise. This use of spread spectrum has mainly military significance. Spread spectrum technique may also be used for managing a frequency field with many users. Instead of giving each user a dedicated frequency within a given band, all the users may operate simultaneously within the whole of the band. The users are instead separated by their own spread spectrum key. This also has civil uses, such as within mobile telephony.

There are thus essential differences between the uses of spread spectrum modulation in radio technology and in an optical system according to the present invention. In the radio technology spread spectrum is, as known, used to intentionally hide a signal in the noise. There is no profit regarding transmission, in using the technique. Purely theoretically it may be chosen to code each single bit as a series of chips given by a key and thus achieve a better signal/noise ratio at the cost of bit rate. But this is needlessly complicated as the bit rate may just as well be reduced directly. The energy is then concentrated in a narrower spectrum and an improvement in the signal/noise ratio is achieved corresponding to what was achieved by using spread spectrum.

A person skilled in the art will know that an optical system operates in both the photon and wave world, and the bandwidth is then not necessarily tied to the bit rate of the modulated signal. A normal laser has a spectral line width many orders of size larger than the modulation frequencies the present invention will be operating in. This line width is dominated by effects operating at photon level, and it does not necessarily become narrower if the bit rate is reduced. Correspondingly the detector is based on photon detection. The line width is given by the material system, but is typically in the order of size of the whole visible spectrum. There is no coupling between this and the bandwidth in an RF-area. In an optical system the same possibility to increase the signal/noise ratio by concentrating the energy in a narrow spectrum band, is thus not provided. The use of spread spectrum on an optical signal thus gives the possibility to detect signals otherwise impossible to detect.

When using the light source for transmission of data to the receiver it may be an advantage if the length of the key is adjusted according to the focus of the receiver in such a manner that the length of the key is reduced as the receiver focus increases. The data transmission rate will thereby increase. The length of the key may be changed in proportion to the receiver focus, or it may be changed stepwise.

The iterative adjustment, resulting from the steps A-E in the first aspect of the invention, continues until best possible orientation or alignment is achieved. This may be defined based on a comparison of where the light hits the light detector relative to the optical axis. When the differences in the intensity of the light hitting the light detectors around the optical axis, is below a predetermined level, the receiver is thus aligned toward the light source.

Alternatively the iterative adjusting in the steps C-E may be limited to a predetermined number of adjustments.

It is to be understood that by use of a key being sent from the light source as light being modulated with spread spectrum the light detectors may be arranged to be able to decode the key and report signal strength on each of the light detectors being checked.

It may for some areas of application be important that the receiver in use is directed toward the light source for essentially most of the time, for example to secure a stable receipt of data being sent from a transmitter. It is therefore an advantage if the steps A-E in the first aspect of the invention are resumed if the differences in intensity of the light hitting the light detectors around the optical axis exceed a predetermined level.

In a second aspect of the present invention there is provided an apparatus, which may be suitable to perform the method according to the first aspect of the invention. The apparatus comprises:

an optical receiver provided with: driving means to be able to move the receiver in a scanning pattern; a detector element being constituted by a plurality of light detectors arranged around the receiver's optical axis to be able to check where the light hits the light detectors relative to the optical axis; focusing means to be able to adjust the area of the incoming light toward the detector element; and an optical transmitter allocated to the receiver and where a spread angle and an optical axis of a light beam sent out from the transmitter, are controlled dependent on the receiver's field of view and optical axis.

The apparatus may be provided with a control circuit arranged to be able to recognize a key received from a light source sending light being modulated with a spread spectrum code, as the transmitter is arranged to be able to send light being modulated with a spread spectrum code.

By sending light being modulated with a spread spectrum code, challenges related to the following are at least solved:

A receiver according to the invention being in a search phase will introductorily be defocused as seen from step A in the first aspect of the invention. For a receiver to be able to find an appurtenant transmitter within a reasonable time, the receiver optics must be arranged defocused such that it covers a large surface in the field that the transmitter is located. This entails that the light may become so weak that it is not detectable in a normal manner without the use of spread spectrum modulation.

The receiver may be directed toward one of many transmitters inside the receiver's search field. When the individual receiver is in the search phase, it will search for a known spectrum key. Other transmitters in the field, having other keys, will not be lifted out of the noise, and will therefore not be visible. This way, a receiver is not aligned toward transmitters which it does not belong together with.

Difficult atmospheric conditions, such as fog, may lead to the light being weakened to below the receiver's sensitivity range and connection with the transmitter is lost. Demodulation with the same key, on the side of the receiver or detectors, will lift the signal out of the noise, making it possible to detect a signal being otherwise to weak.

In situations where vibrations or scintillation makes it difficult to hold a focused beam directed toward the opposing unit, the spread angle may be changed so that the beam covers a larger area. A somewhat inaccurate directing may then be tolerated, as some effect will still hit the receiver. As for the case above of damping, a spread spectrum key may be used to maintain the connection when is the signal strength falls below the detector's sensitivity range.

The use of spread spectrum modulation to let an optical receiver search for, recognize and be aligned with an optical transmitter which is sending data by means of modulated light, with a known key, is also described.

BRIEF DESCRIPTION OF THE DRAWINGS

In the following is described an example of a preferred embodiment illustrated in the accompanying drawings, where:

FIG. 4a shows an alternative embodiment of the lens control system shown in FIG. 3a;

FIG. 4b shows a side view of the lens control system in FIG. 4a seen from the right toward the left;

DETAILED DESCRIPTION OF THE DRAWINGS

Figure 1:
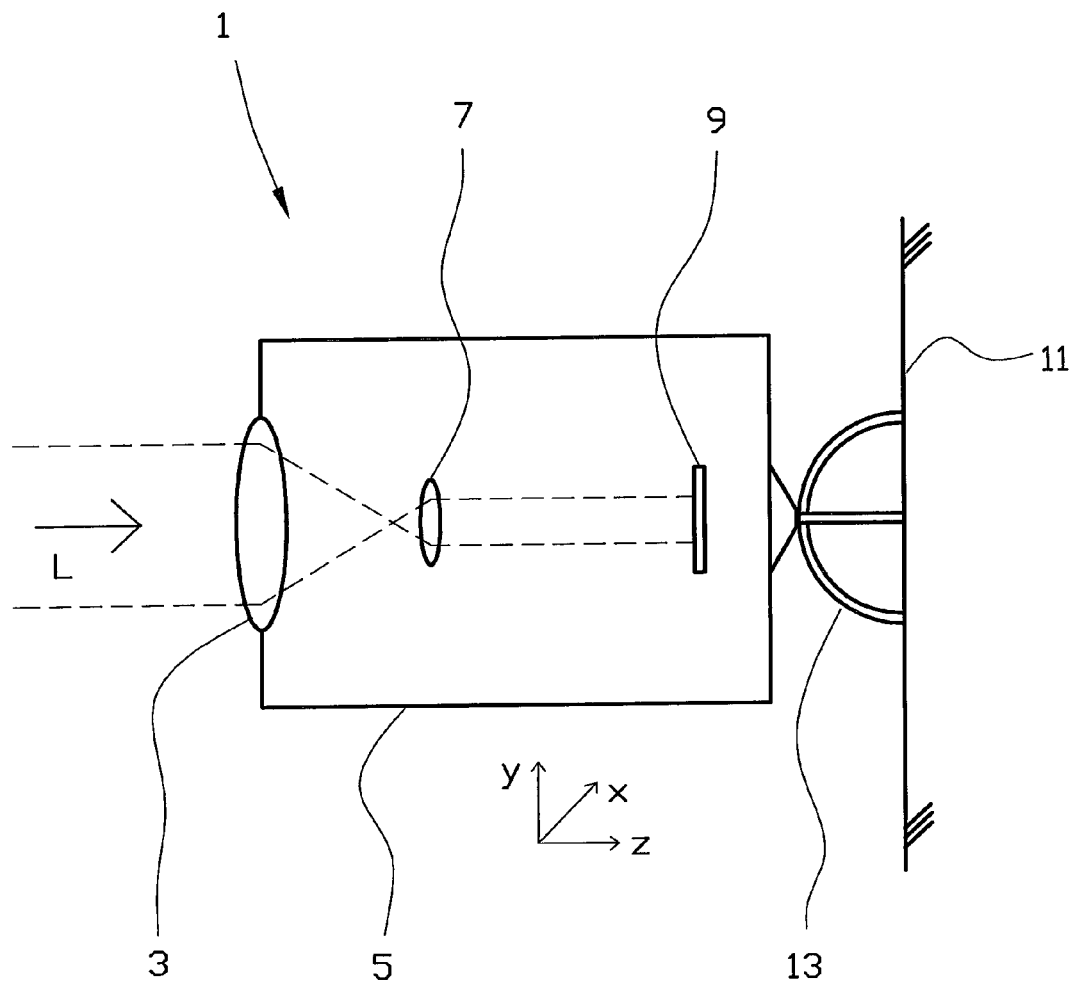
FIG. 1 shows a principle sketch of a receiver according to the present invention.

A person skilled in the art will understand that the figures are only principle sketches showing the optical systerns of the apparatuses. The necessary control systems will be known to a person skilled in the art, and are for this reason not shown specifically in the drawings. In addition the mutual proportions between the individual elements may be distorted.

Equal or corresponding elements are indicated with the same reference numerals in the various figures.

In the figures the reference numeral 1 indicates a receiver according to the present invention. The receiver 1 includes optics including an outer lens 3 and at least one inner lens 7, 7'. Light L hitting the outer lens 3 is refracted and goes further into the receiver 1 and through the inner lens 7, 7'. At least a share of the optics 3, 7, 7' is movable in an X, Y or Z direction, where the X direction is sideways relative to a lens plane, the Y direction is vertical relative to the lens plane, and the Z direction is a direction mainly coinciding with the longitudinal direction of the light beam. The directions X, Y and Z are in some of the figures indicated by arrows or other symbols.

Movements of the lens(es) 7, 7' is provided by means of actuators 75 controlled by means of power from a not shown control system. The actuators 75 constitute at least a share of the drive means mentioned in the second aspect of the invention. A person skilled in the art will understand that the actuators 75 must be connected with for example a portion of a housing 5 wherein the optics 3, 7, 7' are located so that relative movement between the housing 5 and the movable lens(es) may be provided. This connection is not shown in the figures.

The outer lens 3 may in an alternative embodiment (not shown) be configured like a dome constituting a portion of the housing 5.

The control system sends power to the actuators 75 depending on where the light L hits relative to a detector unit 9 which includes a plurality of detector elements 9' arranged around the receiver's 1 optical axis 10, This will be more closely explained in the following during discussion about FIG. 2. The detector elements 9' will also be referred to as the light detectors 9'.

To be able to provide a largest possible scanning area for the receiver shown in FIG. 1, the housing 5 is movably attached to a supporting element 11 by means of an attachment device 13 of a per se known kind that may be moved in so-called pan and tilt. The attachment device 13 may for example be a so-called gimbal that may be moved by means of per se known motors (not shown). The same way as the actuators 75, which may move at least a share of the optics 3, 7, 7', the motors of the attachment device 13 are supplied with power sent from the control system. Said motors may constitute a share of the drive means mentioned in the second aspect of the invention.

If the movement field in the X, Y and Z directions of the optics 3, 7 is sufficiently large to be able to make scanning of a desired field possible, the movable attachment device 13 may be omitted.

Figure 2:
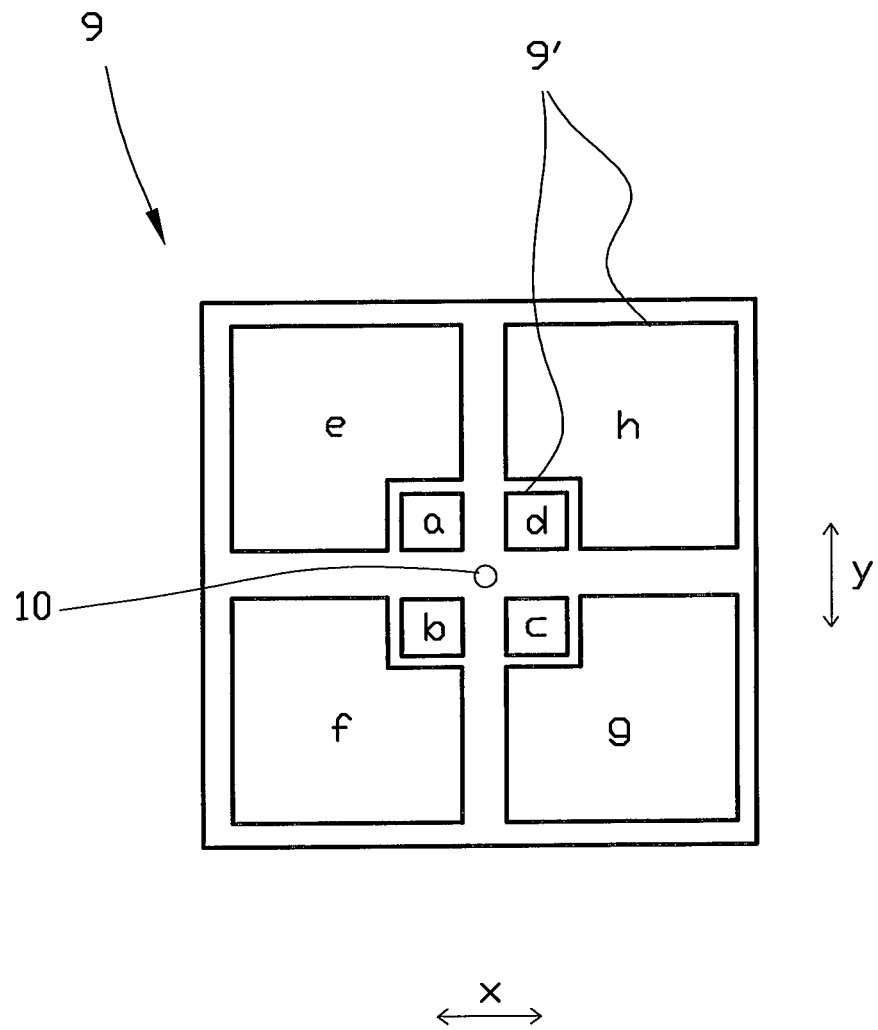
FIG. 2 shows to a larger scale a view of detector elements constituting parts of the receiver shown in FIG. 1.

In FIG. 2 is shown to a larger scale a view of a detector unit 9, which in the embodiment shown consists of all together eight detector elements 9' arranged around the receiver's optical axis 10.

The detector elements 9' include four inner elements marked a, b, c and d, and four outer elements marked e, f, g and h. The outer elements e, f, g and h are much larger than the four inner elements a, b, c and d.

When light L hits all four inner elements a, b, c and d with equal intensity, the light L is centered along the optical axis 10 of the optics, as shown in FIG. 1.

Since the outer elements e, f, g and h cover a much larger area than the inner elements a, b, c and d, they give better sensitivity at defocused light. The outer detector elements e, f, g and h will thus facilitate detection of light L when the receiver 1 is in a search phase and when it is arranged defocused.

The detector elements 9' may be constituted by more than or fewer than the eight elements shown in FIG. 2. The detector elements 9' may for example be constituted by further elements arranged for example outside the outer elements e, f, g and h shown, or they may be constituted by only a number of inner detectors, for example the four inner detector elements a, b, c and d shown.

Depending on where the light L hits relative to the detector elements, the control system will give signals about power to the actuators 75 of the optics 3, 7 (see for example FIG. 3a) and to the motors allocated to the movable attachment device 13 such that a steadily improved centring of the light L around the optical axis is achieved at the same time as the field of view is continually reduced as it appears from the steps C and D according to a first aspect of the invention. The signals are determined by calculating the difference eh−fg. If eh−fg is positive the incoming light L must be directed downward (relative to FIG. 2) toward the optical axis 10. If eh−fg is negative the incoming light L must be directed upward toward the optical axis. Correspondingly eh−fg is calculated to determine in which direction the incoming light L is to be moved sideways relative to FIG. 2. When the incoming light L is such that the signal strengths of the four elements e, f, g and h are equal, it may be assumed that the receiver is roughly directed toward the light source. The receiver's 1 optical angle or field of view is then changed by moving for example the lens 7 in the z-direction (see FIG. 4*b*) such that the incoming light L is somewhat more concentrated on the detector unit 9, following which a new adjustment in the horizontal and vertical planes is carried out by calculating where the beam from the incoming light L hits relative to the detector unit 9. Such a directing is repeated until essentially all the incoming light hits equally on the inner detector elements a, b, c and d, or until a predetermined number of adjustments have been carried out.

The control system may for example be arranged such that when light hits only a few of the outer detector elements e, f, g and h, the directing is controlled by the receiver 1 by means of the motors allocated to the attachment device 13. When the light L hits the inner detector elements a, b, c and d, the directing is controlled by means of the optics alone or by means of the optics and said motors.

The field of view is preferably controlled independently of which means are controlling the directing toward the optical axis.

Figure 3A:
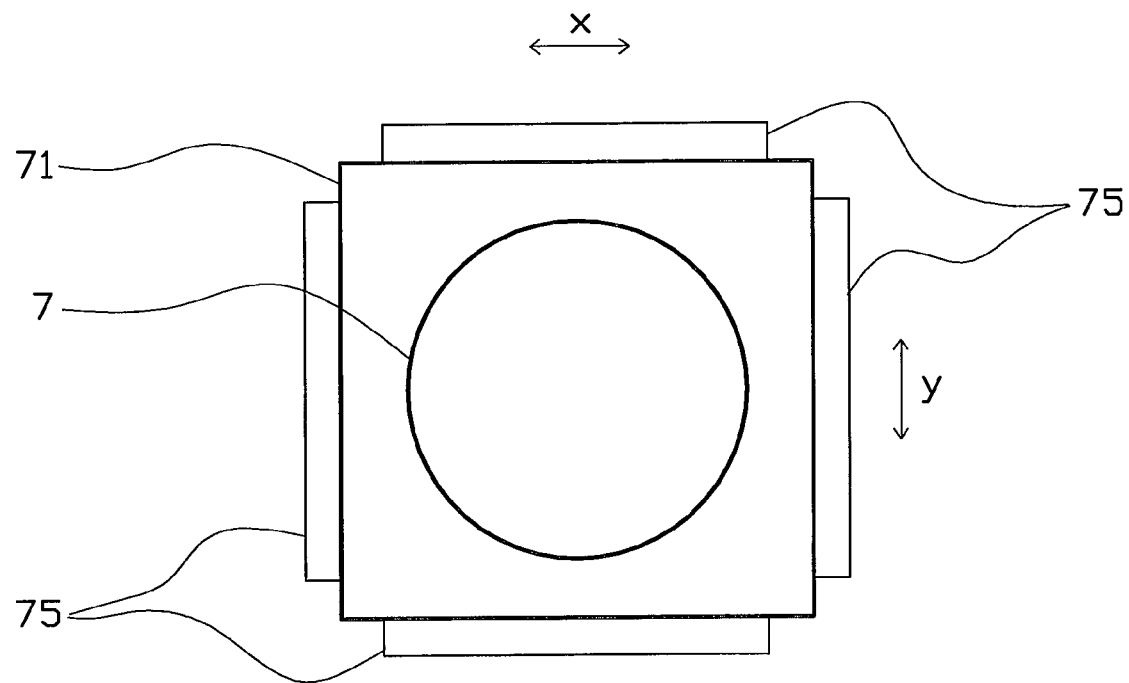
FIG. 3a shows to a larger scale a view of a lens control system arranged to be able to control movement and focus of the optics in the receiver shown in FIG. 1.
Figure 3B:
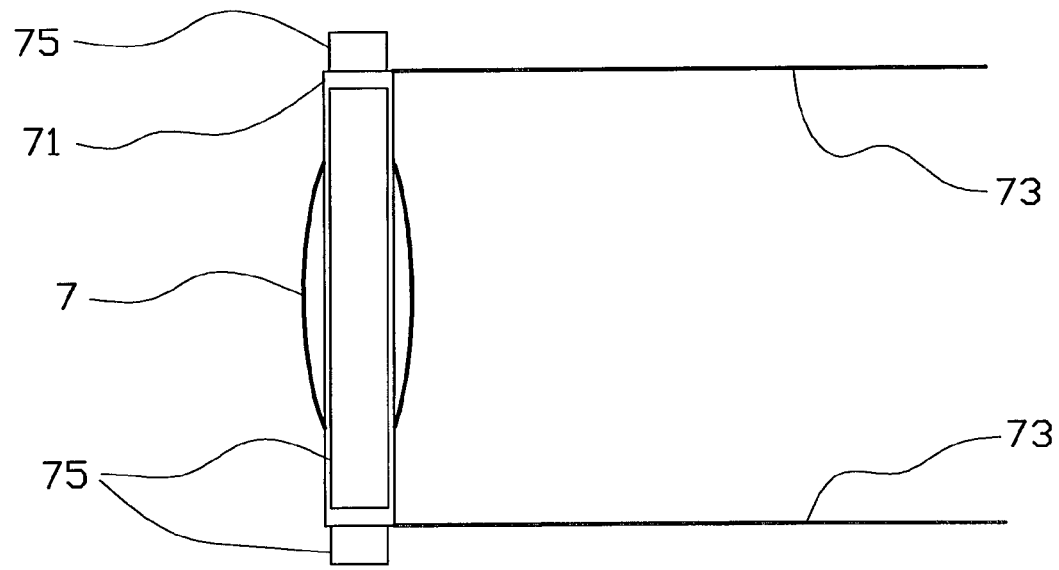
FIG. 3b shows a side view of the lens control system in FIG. 3a seen from the right toward the left.

In FIGS. 3*a* and 3*b* a principle sketch of the inner lens 7 at a larger scale is shown connected to an actuator 75 to be able to be moved in an x-direction and in a y-direction. FIG. 3*a* shows the lens 7 looking from the front toward the lens plane, while FIG. 3*b* shows the lens 7 looking from the right toward the left.

In the embodiment shown the lens 7 is arranged in a lens holder 71. The lens 7 may be of a per se known type having adjustable spread angle. Means for providing the adjustment are not shown.

Four flexible rods 73 support the lens holder 71. In FIG. 3*b* only two of the four rods 73 are shown. The flexible rods 73 are in a first end portion attached to one corner portion each of the lens holder 71 in such a manner that the rods make a parallelogram movement of the lens holder 71 possible. In a second end portion (not shown) the rods are attached to for example a portion of the housing 5. This is however not shown.

Four actuators 75 are connected to the lens holder 71. The actuators 75 may be constituted by for example electro magnets or motors of a per se known kind arranged to be able to move the lens holder 71 and thus the lens 7 in an x- and a y-direction. The actuators 75 are controlled by means of the control system. Power from the control system is to the actuators may for example be transferred via the rods 73 if these are of an electrically conductive material.

FIGS. 4*a* and 4*b* show an alternative embodiment of the lens control system based on the same principle as shown in FIGS. 3*a* and 3*b*. In the embodiment shown, the lens holder 71 is suspended from four flexible rods 73 whereof only two appear in each of the figures. In the bottom and top portions of the lens holder 71, actuators 75 which may provide a movement of the lens holder 71 and the lens 7 in an x-direction, are arranged. Approximately in the middle of the vertical side surfaces of the lens holder 71, extending perpendicularly on the lens plane, actuators 75 are located. By supplying power to the latter actuators 75, the lens holder 71 and thereby the lens 7 will be moved in a z-direction as indicated in FIG. 4*b* to thereby change the field of view to the receiver 1 shown in FIG. 1.

Figure 5:
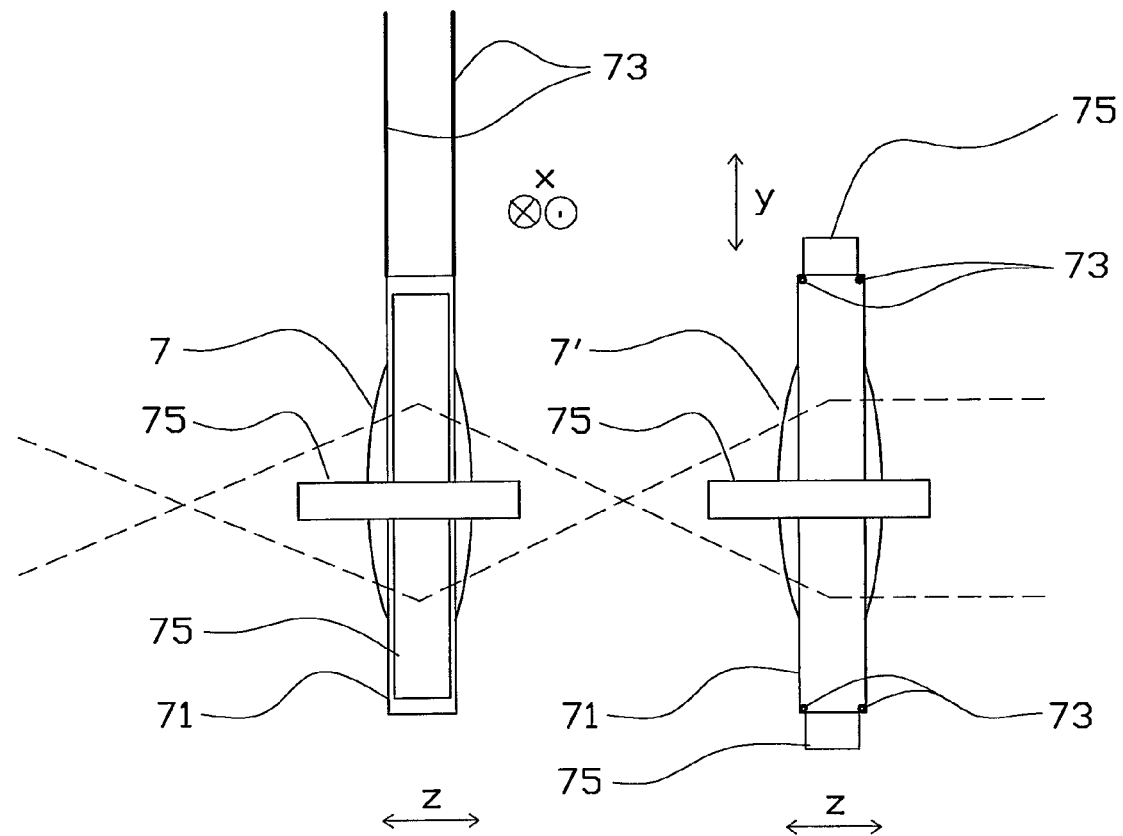
FIG. 5 shows a side view of a lens control system constituted by two movable lenses.

In FIG. 5 is shown an embodiment where two inner lenses 7, 7' are suspended as shown in FIGS. 4*a* and 4*b* and as described above, but where the lenses 7, 7' are suspended in such a manner that the flexible rods 73 are fitted at 90° relative to each other. Light is shown by dotted lines. The lens 7 may in the embodiment shown, be moved in an x- and a z-direction, while the lens 7' may be moved in a y- and a z-direction.

Figure 6:
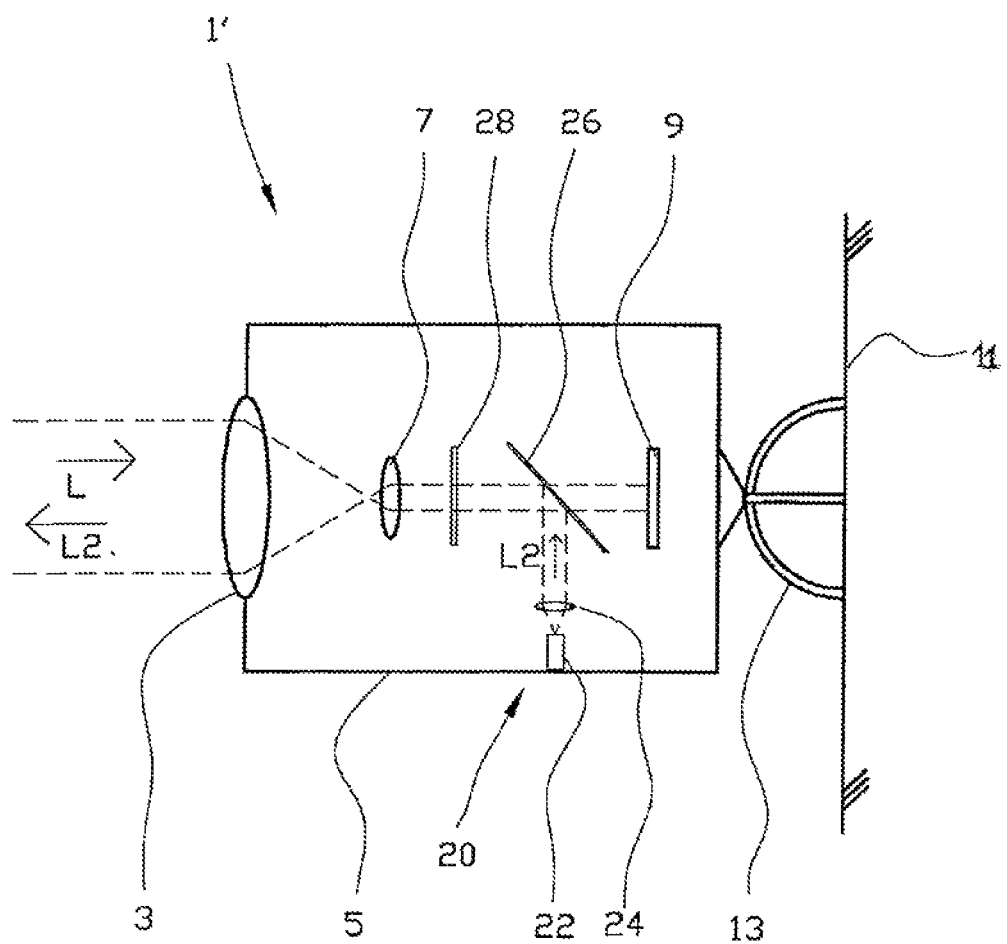
FIG. 6 shows a principle sketch of the receiver in FIG. 1, but where the receiver in addition is provided with a transmitter, where the transmitter and the receiver are arranged as a transceiver, which transmits and receives light confocally.

FIG. 6 shows a principle sketch of a transceiver 1' constituted by the receiver 1 shown in FIG. 1, but where the receiver 1 in addition is provided with a transmitter 20. The transmitter 20 includes an optical source in the form of a laser light 22 sending light L2 through a collimating optics 24. The laser light 22 may be of a kind available in the market. It is emphasized that the light L2 being sent from the optical source may be another kind of light than laser light.

In the embodiment of the transceiver 1' shown, ingoing light L is confocal with the outgoing light L2, i.e. it moves along the same optical axis, but in the opposite direction.

This is achieved by separating ingoing light L and outgoing light L2 by means of orthogonal polarisation and a polarising beam splitter 26.

The light L2 from the laser light 22 is linearly polarised perpendicularly to the plane. The laser light 22 is reflected in the polarising beam splitter 26 and hits a quarter wave plate ($\lambda/4$ plate) 28. The quarter wave plate 28 is oriented having the optical axis 45° to the polarising direction. The light L2 is then circularly polarised before going out through the movable lens 7 and is sent out of the transceiver 1' through the outer lens 3.

The transceiver 1' in FIG. 6 is suspended from a support element 11 by means of an attachment device 13 in an equivalent manner to the receiver 1 shown in FIG. 1.

Figure 7:
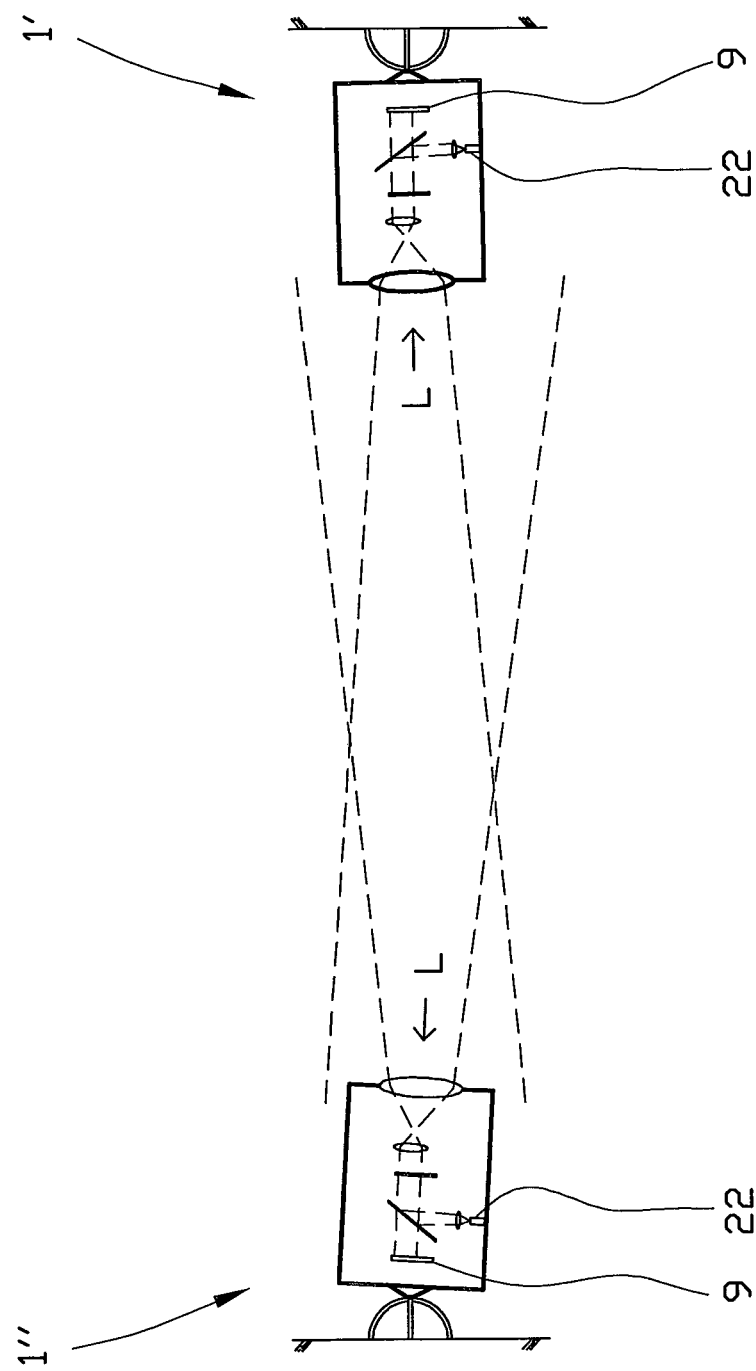
FIG. 7 shows a principle sketch of the transceiver in FIG. 6 under alignment toward another transceiver positioned apart from the transceiver.
Figure 8:
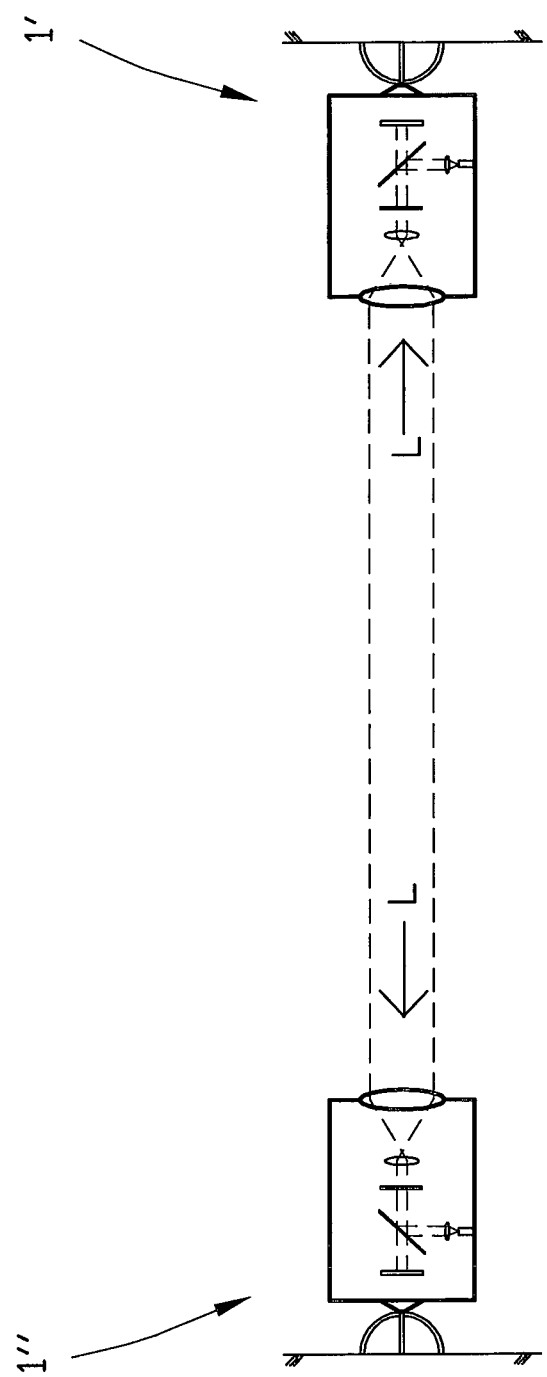
FIG. 8 shows the transceivers in FIG. 7 after being aligned.

The light L that goes into the transceiver 1' may be sent out from a corresponding transceiver 1" shown in the FIGS. 7 and 8, and is circularly polarised with an opposite direction of rotation relative to the light L2 being sent out from the transceiver 1'. The light L follows the same optics 3, 7 as the light L2 up to the quarter wave plate 28. Since the light L has an opposite rotation to the light L2, it will after the quarter wave plate 28 be linearly polarised along the plane and therefore go straight is through the beam splitter 26. The light L may thereafter hit the detector unit 9 with the detector elements 9', as shown in FIG. 4.

In FIGS. 7 and 8 are shown two identical transceivers 1', 1" arranged to be able to communicate with each other.

The information is transferred between the transceivers 1', 1" by modulating the intensity of a laser beam L which in the following is also referred to as the light beam L since the light may be another light than laser light. The light beam L moves freely through the room from a transmitter in one of the transceivers 1', 1" and is detected by a receiver in the opposing transceiver 1', 1". The distance between the transceivers 1', 1" is in the embodiment shown approx. 100 meters. The figures are thus strongly distorted. Each of the transceivers 1', 1" is in the embodiment shown configured identically with the transceiver 1' shown in FIG. 6. For this reason are only some of the elements shown in the figure, indicated by reference numerals.

FIG. 7 shows the transceivers 1', 1" in an aligning phase wherein the receiver in each of the transceivers 1', 1" is arranged defocused, but after the light beam L from the laser light 22 has hit at least one of the light detectors 9' in each of the receivers. In the embodiment shown, direction and spread angle of the light beam L, are determined by direction and optic angle or field of view, of the receiver. The light beam L being sent out from each of the transceivers 1', 1" thus constitutes a wide cone. It is to be understood that each of the transceivers 1', 1" may have scanned the surroundings before the receiver in each of the transceivers 1', 1" registered the light beam L and went from step B to step C according to the first aspect of the invention. When the cones overlap as shown some of the light beam L from the transmitter of the one transceiver 1' will hit at least one of the light detectors 9' arranged around the optical axis of the reciprocal receiver arranged in the opposing transceiver 1". A positioning algorithm connected to the control system for the actuators 75 for the lenses 7, 7' and motors for movement of the attachment devices 13, will thereafter direct the transceiver 1' toward the point where the light intensity is greatest, i.e. toward the point where the light L hits essentially equally on the detector elements 9' arranged around the optical axis 10 as described in the discussion of FIG. 2 above. Thus the transceivers 1', 1" go through a centering or aligning relative to each other. Thereafter, as stated in step D according to the first aspect of the invention, the light beam's L spread angle may be reduced so that as much of the light as possible hits the opposite light detector 9. This is repeated iteratively until an optimum alignment of the transceivers 1', 1" is achieved. Such an optimum alignment is shown in FIG. 8.

The transceivers 1', 1" may in advance, as described above, be equipped with a spread spectrum key where two or more units which shall communicate, have the same key. This may be hard coded in firmware, or for example be stored in an appurtenant smart card.

The detector unit for use in spread spectrum modulation may be of the kind described above so that the difference in signal strength between the individual detector elements e, f, g and h and also a, b, c and d indicates the direction the incoming light L is coming from. Spread spectrum decoding is performed individually on the detector elements 9', and the signal strength is compared.

When the light beam L has been centered in a sufficiently small area on the light detectors, it will come to a point where the spread spectrum decoding gives maximum signal in all four of the inner elements a, b, c and d. I.e. that all chips in the spread spectrum key are detected correctly. Then this signal cannot be used for further improvement of the alignment. Instead the analogous signal strength in each individual element may be determined, such as a person skilled in the art will know it. Correspondingly there may be switched from spread spectrum to direct coding of the signal when the signal strength has become sufficiently high.

During particularly unfavourable atmospheric conditions such as fog, the damping may become so large that the signal becomes weaker than the sensitivity range of the receiver 1. Using receivers according to prior art this leads to a sudden loss of the connection. According to the present invention the transceivers will at low signal strength pass from direct coding to spread spectrum coding of the bit flow. The bandwidth goes down, while the sensitivity goes correspondingly up. One set of keys is used, where the key length may be increased as the signal strength is reduced.

The invention claimed is:

1. A method of directing an optical receiver associated with an optical transmitter towards a light source, the method comprising the steps of:
   a) providing the optical receiver with an optical system and a plurality of light detectors positioned around a primary optical axis, the light detectors being configured to receive a first light beam and to detect an intensity thereof relative to the primary optical axis which extends linearly from the light detectors through the optical system, the optical system including a pair of inner lenses movably mounted in the receiver in different x, y and z directions in response to the intensity of the first light beam on the light detectors;
   b) arranging the receiver defocused such that the optical system embraces a largest possible field of view of an area where the first light beam is located, and such that the first light beam is refracted with a largest possible spread angle towards the light detectors;
   c) letting the receiver search for the light source by scanning a surrounding environment until the first tight beam hits at least one of the light detectors;
   d) calculating where the first light beam hits relative to the primary optical axis, and, with the current field of view, adjusting the receiver such that the first light beam is directed towards the primary optical axis;
   e) reducing the field of view of the receiver by moving the pair of inner lenses independently of one another in the x, y and z directions; and
   f) repeating the steps d) and e) until a minimum spread angle of the first light beam centers in the smallest possible spot on the light detectors relative to the primary optical axis,
   wherein the secondary optical axis and a spread angle of the second light beam sent out from the transmitter is dependent on the directing of the primary optical axis and the field of view of the receiver.

2. The method of claim 1, wherein the receiver and the transmitter are arranged as a transceiver.

3. The method of claim 1, wherein the first light beam and the second light beam pass in opposite directions through the optical system and along the primary optical axis.

4. The method of claim 1, wherein the receiver is configured to recognize a key sent from the second light beam which modulates a light with spread spectrum.

5. The method of claim 1, wherein the steps b)-f) are repeated if differences in the intensity of the first light beam with the light detectors exceeds a predetermined level.

6. The method of claim 1, wherein the directing of the receiver is controlled by at least one of a set of motors connected with the pair of movable inner lenses and a set of motors connected to the receiver for providing movement thereof.

* * * * *